F. EVANS.
GROUTER DEVICE FOR TRACTOR WHEELS.
APPLICATION FILED APR. 2, 1919.
1,391,049.
Patented Sept. 20, 1921.
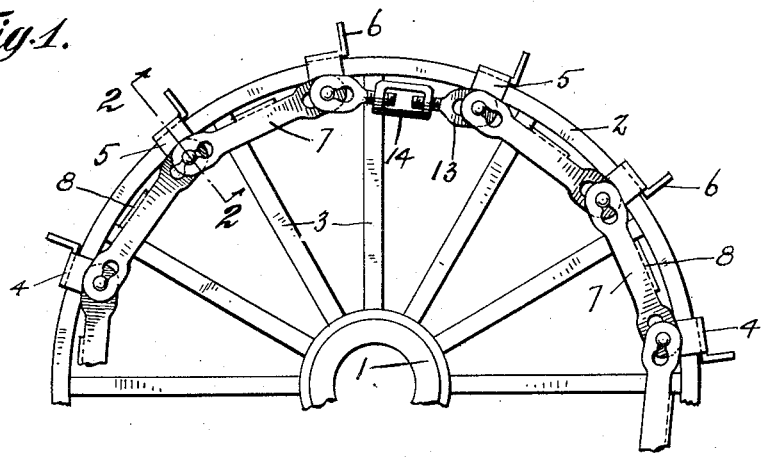
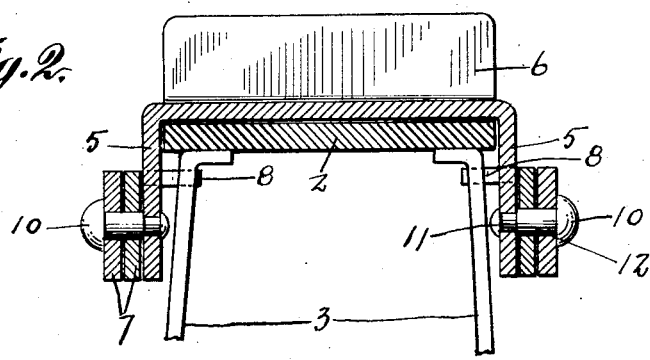
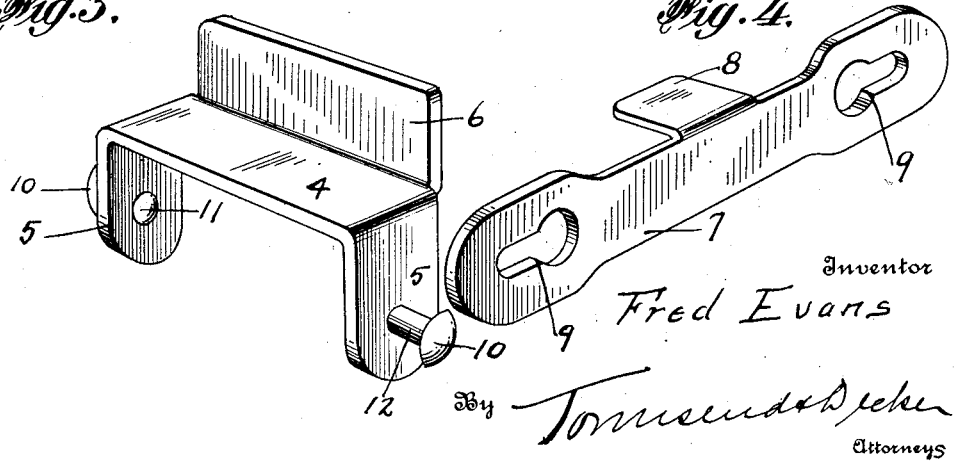
Inventor
Fred Evans
By Townsend & Decker
Attorneys

UNITED STATES PATENT OFFICE.

FRED EVANS, OF SUMMIT, NEW JERSEY, ASSIGNOR, BY MESNE ASSIGNMENTS, TO BETHLEHEM STEEL COMPANY, OF BETHLEHEM, PENNSYLVANIA, A CORPORATION OF PENNSYLVANIA.

GROUTER DEVICE FOR TRACTOR-WHEELS.

1,391,049.   Specification of Letters Patent.   Patented Sept. 20, 1921.

Application filed April 2, 1919. Serial No. 286,922.

*To all whom it may concern:*

Be it known that I, FRED EVANS, a citizen of the United States, and a resident of Summit, in the county of Union and State of New Jersey, have invented certain new and useful Improvements in Grouter Devices for Tractor-Wheels, of which the following is a specification.

My invention relates to attachments for tractor wheels and more particularly to a grouter attachment for said wheels by means of which said wheels will be enabled to effectively travel on marshy or insecure ground.

The object of my invention is the production of a grouter attachment for tractor wheels which shall be of extreme simplicity of construction and which shall be capable of expeditious attachment to or detachment from the wheel.

A further object of the invention is the production of a grouter attachment of the character above described the main or body portion of which shall be connected together by quickly detachable connecting members or links whereby the size or circumference of the attachment may be enlarged or decreased to meet varying sizes of wheels and whereby the attachment as a whole may be easily removed from the wheel by the simple removal of a pair of the links.

Other and further objects of my invention will appear from the accompanying description, the invention consisting in the novel parts and combinations of parts hereinafter more particularly described and then specified in the claims:

In the accompanying drawings:

Figure 1 is a side elevation of my improved grouter attachment as applied to a tractor wheel.

Fig. 2 is an enlarged vertical cross-section on the line 2—2 of Fig. 1.

Fig. 3 is a perspective view of the main or body portion of the device.

Fig. 4 is a perspective view of one of the connecting links.

Referring more particularly to the several figures of the drawing:

1 indicates the hub of a tractor wheel and 2 the rim thereof which is preferably of relatively large width having a flat tread as in the usual type of wheels of this character. Said hub 1 and rim 2 are connected together by spokes 3 which I have shown merely for the sake of illustration as arranged in pairs although the invention is not limited in its application to a wheel of any specific type.

4 indicates the main or body portions of my improved grouter attachment each of which is provided with downwardly projecting flanges 5 and an upwardly projecting flange 6 forming an earth-gripping element. For simplicity and cheapness of manufacture the said body portion 4, downwardly projecting flanges 5 and earth-gripping element 6 are preferably formed of a single integral piece of sheet metal. As clearly illustrated in Fig. 2 the body portion 3 is adapted to rest on or engage the tread surface of the rim 2 of the wheel with the flanges 5 projecting downwardly over the sides of said rim to prevent lateral displacement of said body portion on the wheel and the earth-gripping element projecting outwardly from the rim.

7 indicates the links of my improved attachment each of which may be provided with a lug or stop 8 turned over in a plane transverse to the plane of the link and preferably integral with said link, said lugs being adapted to engage the spokes 3 of the wheel (see Fig. 2) to prevent "creeping" of the attachment when in mounted or in operative position on the rim of the wheel or in that position shown in Fig. 1. The said links are provided preferably with slots 9 at either end thereof, said slots being preferably enlarged at their inner ends and reduced at their outer ends as clearly shown in Fig. 4. The enlarged inner ends of said slots 9 are adapted to receive the heads 10 of pins 11, said pins being securely fastened in any desired manner to the downwardly projecting flanges 5 and extending outwardly therefrom, and the reduced outer ends of said slots 9 are adapted to receive the shanks 12 of the said pins. Obviously, therefore, when the shanks 12 of the pins 11 engage the reduced outer ends of the slots 9, the heads 10 of the pins act as stops to prevent the withdrawal of the links away from the downwardly projecting flanges 5.

As is manifest from the foregoing description, a broken or mutilated grouter may be readily replaced. Also my improved attachment may be made of any length by the simple addition of any desired number of body members which are connected together in an obvious manner by the detachable links, a pair of which, one on either side of the wheel, are used for connection of any two body members.

To detachably connect the ends of the attachment together I have provided links 13 (see Fig. 1), one for either side of the wheel, whose ends are similar in construction to the ends of the links 7 but the body portions of which are cut in two and the opposed ends are screw-threaded so as to receive and engage the ordinary turn-buckles 14 for drawing the ends together.

To place the attachment in position on the wheel, it is held by the ends thereof and then slipped transversely over the wheel after which the body members are properly positioned on the rim. The ends of the attachment are then drawn together by means of the turn-buckles 14 in order to tighten the device on the rim and hold the same securely therein. When the attachment is in operative position on the rim the tractive properties of the wheel are considerably enhanced due to the flanges 6 which grip the earth when the wheel is in operation and also due to the lugs 8 which engage the spokes of the wheel and prevent "creeping" of the attachment around the rim. To remove the device from the wheel, the opposed ends of links 13 may be uncoupled by removal of the turn-buckles 14 or the same result may be accomplished by unloosening the turn-buckles and then withdrawing the ends of any pair of the links from their engagement with the adjacent pins 11 by slipping the heads 10 of said pins through the enlarged portion of the slots 9 in the links.

The grouter 6 may be disposed at any desired angle across the thread of the wheel rim. The invention is not limited to the use of the anti-creeping lugs 8; also any other suitable means may be employed to prevent the grouters creeping or slipping around the wheel.

What I claim as my invention is:—

1. In a grouter attachment for wheels, a plurality of body members engaging the thread of the wheel and having earth-gripping elements extending outwardly therefrom, laterally extending pins carried by said body members and provided with heads thereon and links provided with slots receiving said pins, said slots being enlarged at an end thereof whereby said links may be detachably and loosely connected to said body members.

2. In a grouter attachment for wheels, a plurality of body members engaging the tread of the wheel, earth-gripping elements extending outwardly from said body members, flanges extending downwardly from said body members and adapted to prevent lateral displacement of said members on said wheel, links provided with slots in either end thereof and with laterally extending anti-creeping means adapted to engage the spokes of the wheel, pins carried by the downwardly extending flanges of said body members and adapted to engage the slots of said links whereby said links may be detachably connected to said downwardly extending flanges and means for detachably connecting together the ends of the attachment.

3. In a grouter attachment for wheels, a plurality of body members engaging the tread of the wheel and having earth-gripping elements extending outwardly therefrom, links detachably connecting said body members together and rigid anti-creeping means integral with the bodies of said links and projecting laterally therefrom and adapted to engage the spokes of the wheel.

Signed at New York in the county of New York and State of New York this 1st day of April A. D. 1919.

FRED EVANS.

Witnesses:
F. B. TOWNSEND,
IRENE LEFKOWITZ.